(12) United States Patent  (10) Patent No.: US 7,327,562 B2
Littlepage  (45) Date of Patent: Feb. 5, 2008

(54) LAPTOP COMPUTER CASE

(76) Inventor: Cory Littlepage, 213 Pintail Loop, San Marcos, TX (US) 78666

( * ) Notice: Subject to any disclaimer, the term of this patent is extended or adjusted under 35 U.S.C. 154(b) by 16 days.

(21) Appl. No.: 11/238,387

(22) Filed: Sep. 29, 2005

(65) Prior Publication Data

US 2007/0070590 A1  Mar. 29, 2007

(51) Int. Cl.
 *H05K 5/00* (2006.01)
(52) U.S. Cl. .................... 361/683; 190/11; 248/444
(58) Field of Classification Search ............... 361/683; 248/444; 190/11
 See application file for complete search history.

(56) References Cited

U.S. PATENT DOCUMENTS

| | | | | |
|---|---|---|---|---|
| 661,194 | A * | 11/1900 | Rothchild et al. ............ | 190/11 |
| 3,315,621 | A * | 4/1967 | Szymber ...................... | 108/34 |
| 4,049,091 | A * | 9/1977 | Chubb ...................... | 190/18 R |
| 4,412,604 | A * | 11/1983 | Bell et al. ...................... | 190/1 |
| 4,595,086 | A * | 6/1986 | Simpson ...................... | 190/11 |
| 4,856,627 | A * | 8/1989 | Polatov ...................... | 190/11 |
| 4,966,258 | A * | 10/1990 | Hawley ...................... | 190/4 |
| 5,242,218 | A * | 9/1993 | Cota et al. ................... | 312/244 |
| 5,522,642 | A * | 6/1996 | Herzog ................... | 297/344.18 |
| 5,871,094 | A | 2/1999 | Leibowitz | |
| 6,036,011 | A * | 3/2000 | DeCurtis et al. ............ | 206/320 |
| 6,068,355 | A * | 5/2000 | Thorp ........................ | 312/241 |
| 6,311,944 | B1* | 11/2001 | McKsymick et al. ....... | 248/461 |
| 6,811,006 | B1* | 11/2004 | Mundle ...................... | 190/11 |
| 7,055,847 | B2* | 6/2006 | Miller et al. ................ | 280/638 |
| 2004/0226791 | A1* | 11/2004 | Levy ........................... | 190/11 |
| 2005/0248913 | A1* | 11/2005 | Hassett et al. .............. | 361/683 |

* cited by examiner

*Primary Examiner*—Jayprakash Gandhi
*Assistant Examiner*—Ingrid Wright
(74) *Attorney, Agent, or Firm*—Mark E. Scott; Conley Rose, P.C.

(57) ABSTRACT

A laptop computer case. At least some of the illustrative embodiments are a laptop computer case comprising a housing (the housing defines a top portion, bottom portion, front, back, left side, and right side), and legs coupled to the bottom portion of the housing (the legs extend from the housing to a substantially horizontal surface below the housing, wherein each leg has a proximal portion proximate to the housing, a distal portion that contacts the horizontal surface, and a medial portion). The medial portion of at least two of the legs extends through a plane that bisects the housing perpendicular to the front and back, and the legs render the case self-bearing.

8 Claims, 4 Drawing Sheets

LAPTOP COMPUTER CASE

CROSS-REFERENCE TO RELATED APPLICATIONS

Not applicable.

BACKGROUND OF THE INVENTION

1. Technical Field of the Invention

The various embodiments of the present invention relate to laptop computer cases. More particularly, the various embodiments of the present invention relate to a laptop computer case that also functions as a self-bearing workstation.

2. Background Information

Laptop computers moved the workstation from being limited to a person's desk to almost any location. When using a laptop computer outside the office environment, placement of the laptop may be difficult. For example, the laptop may be placed on a surface (e.g., a coffee table or the user's lap), but that surface may not be the proper height for ergonomic use. With regard to the lap in particular, it may be difficult to balance the laptop, and some laptops generate significant heat which may be uncomfortable, and could lead to minor burns of the user's legs.

Laptop computer cases are employed to ease transport and reduce the risk of physical damage to laptop computers. The role of the laptop computer case in most situations ends when the user wishes to use the laptop computer.

Demand persists for improved laptop carrying cases and work environments. In particular, demand for more convenient and comfortable work environments, and for laptop cases that minimize risk of physical damage, is ongoing.

SUMMARY

The problems noted above are solved in large part by a laptop computer case. At least some of the illustrative embodiments are a laptop computer case comprising a housing (the housing defines a top portion, bottom portion, front, back, left side, and right side), and legs coupled to the bottom portion of the housing (the legs extend from the housing to a substantially horizontal surface below the housing, wherein each leg has a proximal portion proximate to the housing, a distal portion that contacts the horizontal surface, and a medial portion). The medial portion of at least two of the legs extends through a plane that bisects the housing perpendicular to the front and back, and the legs render the case self-bearing.

Other illustrative embodiments are a method comprising employing a laptop computer case as a self-bearing computer workstation by extending a plurality of legs from the bottom of a housing where the legs are coupled to the housing, orienting the legs such that a medial portion of at least two legs crisscross in a plane that bisects the housing perpendicular to the front and back (the legs extending through the plane at substantially the same point); resting distal end of each leg on a substantially horizontal surface, opening the top portion of the housing to access a laptop computer and operating the laptop computer as the housing continues to frame at least a portion of the laptop.

BRIEF DESCRIPTION OF THE DRAWINGS

For a more detailed description of the preferred embodiments of the present invention, reference will now be made to the accompanying drawings, wherein.

NOTATION AND NOMENCLATURE

Figure 1:
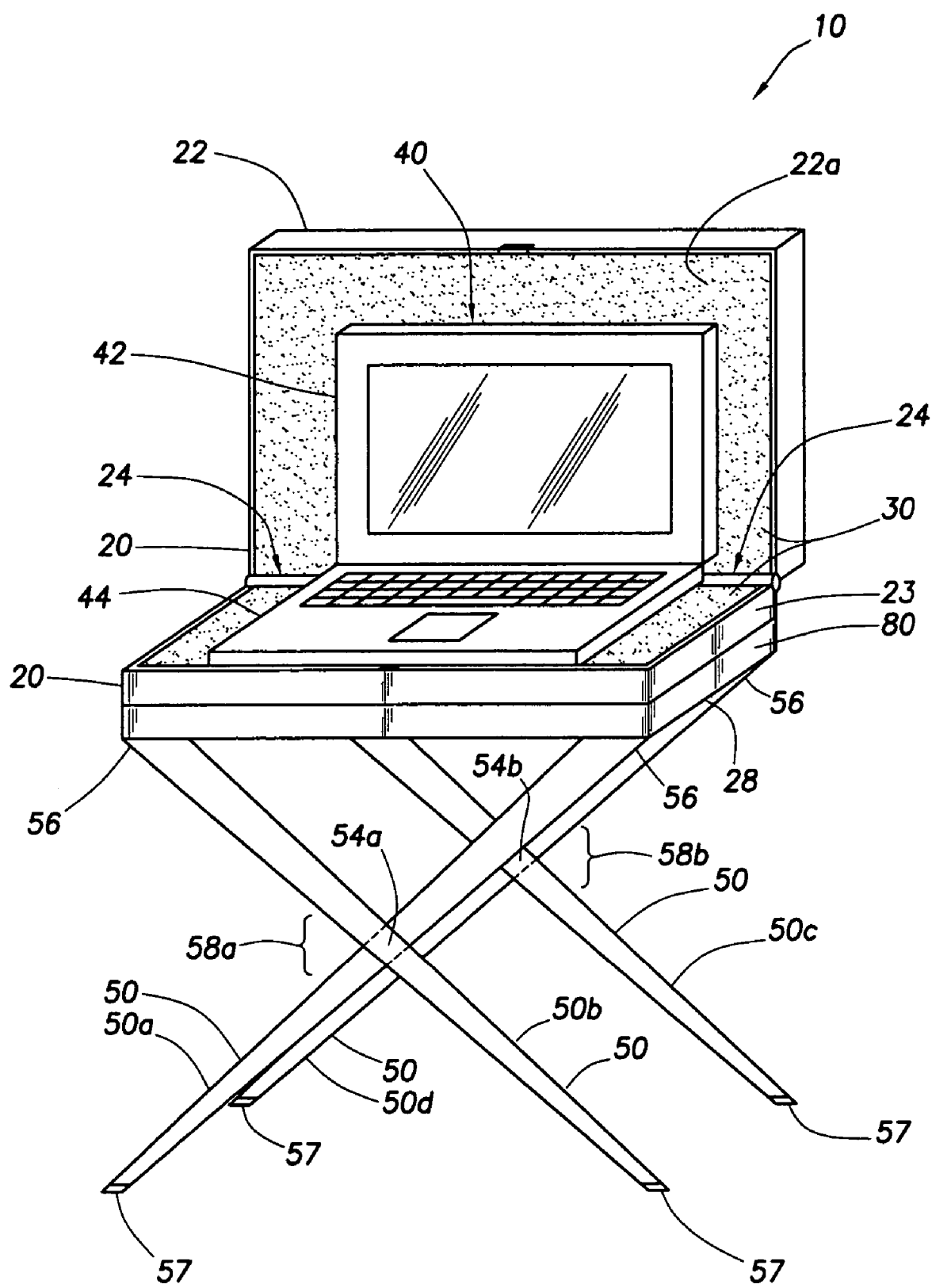
FIG. 1 illustrates an embodiment of a laptop computer case in accordance with the present disclosure.

Certain terms are used throughout the following description and claims to refer to particular system components. This document does not intend to distinguish between components that differ in name but not function. For example, the specification and claims use the term "laptop" to refer to a small, portable computer. A laptop may be equivalently and alternatively be referred to as a portable computer, a notebook computer, and the like.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

The following disclosure is directed to various embodiments of the invention. Although one or more embodiments may be preferred, specific embodiments disclosed should not be interpreted to limit the scope of the disclosure. One skilled in the art will understand that the disclosure has broader application than the embodiments disclosed.

Reference numerals are employed in the present disclosure for the sole purpose of orienting the reader with respect to specific features of embodiments depicted in drawings. A reference numeral and related feature should not be construed as relevant/limiting to all embodiments, but relevant to at least those embodiments depicted in the drawing that includes the reference numeral/feature. Thus, it is envisioned that embodiments of the invention exist to which the specific reference numerals and related features employed herein will not apply.

Disclosed herein is a laptop computer case that protects a laptop computer (or "laptop") from damage caused by physical impacts, and that incorporates legs that allow the case to act as a self-bearing stand upon which a laptop may be operated. In some embodiments, the legs are crisscrossing legs such that a seated user's legs may be astride the legs of the laptop computer case while remaining comfortably and/or appropriately close together. Further, the laptop computer case permits operation of a laptop by opening the case without the necessity of removing the laptop from the case.

FIG. 1 illustrates embodiments of a laptop computer case 10 in accordance with the present disclosure. The case 10 comprises a housing 20 that in some embodiments defines outer dimensions of the case 10. Flexible foam 30 is fitted within the housing 20 and accommodates a laptop 40. In some embodiments the case 10 comprises legs 50. The case 10 may be rendered self-bearing by extending the legs 50 to a substantially horizontal surface such as the floor.

The housing 20 may comprise a partially separable top portion 22. FIG. 1 illustrates the inside 22a of the top portion 22 when the top portion 22 is partially separated from the bottom portion 23 of the housing 20 along a hinge line 24. The top portion 22 serves as a lid for the case 10 where the lid is open in the configuration of FIG. 1.

Figure 2:
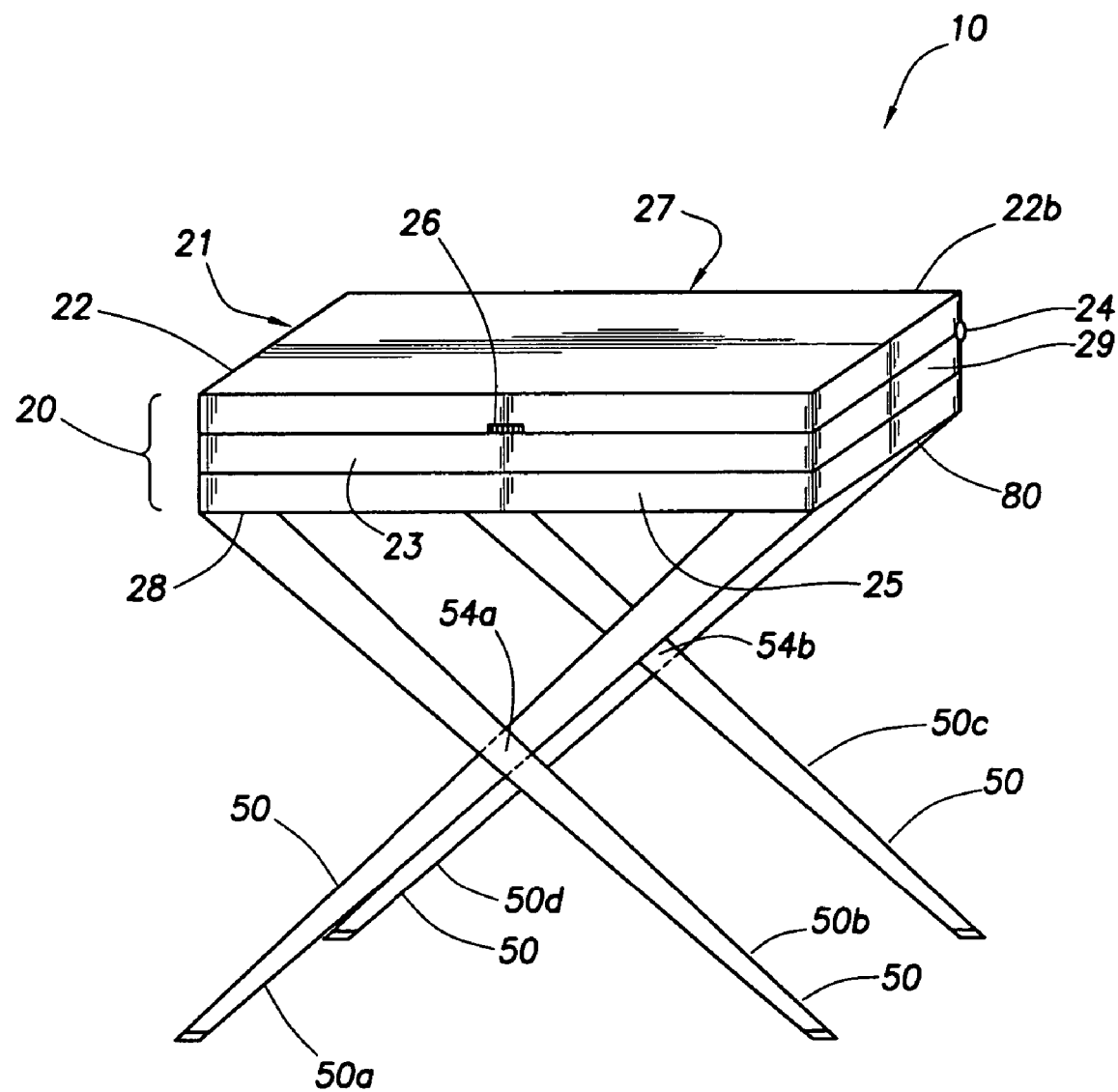
FIG. 2 illustrates an alternative view of the laptop computer case in accordance with at least some embodiments of the present disclosure.

FIG. 2 illustrates an alternative view of the laptop computer case. In particular, FIG. 2 illustrates the laptop computer case 10 in a closed configuration, thus highlighting the roughly volumetric rectangular shape of the closed case 10 notwithstanding the extended legs 50. The outer surfaces of the case 10 comprise a top portion 22, bottom portion 23, front 25, back 27 (not visible in FIG. 2), left side 21 (not visible in FIG. 2), and right side 29. The top portion 22, bottom portion 23, front 25, back 27, left side 21, and right side 29 are defined from the perspective of a user (not shown) seated facing the front 25 of the case 10. In FIG. 2 the top portion 22 is closed such that the top portion 22 is mated to the bottom portion 23. In this closed position, the front 25, back 27, left side 21 and right side 29 are each comprised of the mated top portion 22 and bottom portion 23. The top portion 22 opens and closes by pivoting along a hinge line 24, which may be a physical hinge, or which may be accomplished by use of a pliable fabric. The housing 20 accommodates the laptop 40 (FIG. 1), and the laptop 40 is situated within the housing 20, such that hinging the top portion 22 away from the bottom portion 23 corresponds to opening the laptop 40 by lifting the monitor 42 from the base 44 of the laptop.

FIG. 2 also shows a latch 26 that holds the top portion 22 closed or mated to the bottom portion 23. FIG. 2 shows a single latch 26, but alternative embodiments may include multiple latches. Any mechanism to hold the top portion 22 in a closed orientation with respect to the bottom portion 23 may be alternatively used. Latch 26 or other mechanisms used to keep the top portion 22 in a closed orientation are valuable to ensure that the laptop (inside the housing in FIG. 2) remains in the housing 20 during transport as the case 10 may be subjected to jostling and impacts. A non-limiting list of suitable alternative mating mechanisms comprises buttons, snaps, zippers, and the like.

The housing 20 may comprise any shape that suitably accommodates a laptop computer. In some embodiments, the shape of the housing corresponds to the shape of the laptop. For example, the rectangular shape of the laptop 40 in FIG. 1 corresponds to the rectangular shape of the case 10 in FIG. 1. Alternatively, the shape of the housing may accommodate a laptop plus other devices, such as with additional storage for computer peripherals, work materials, or even travel gear unrelated to the laptop. Further still, additional detachable modules may be coupled to the housing as functionally practical for additional storage. When closed, the housing 20 of FIGS. 1 and 2 may resemble the shape and look of a briefcase.

Returning to FIG. 1, FIG. 1 shows the top portion 22 of the housing continuing to accommodate the monitor 42, even when the laptop 40 is in an operable position. In some embodiments, the foam 30 of the top portion 22 remains mated to the monitor 42 as the top portion 22 and monitor 42 are opened. Such mating may be due to the snug fit of the foam 30 on the laptop monitor 42, a mechanical bond, such as a strap or adhesive, or combinations thereof. In alternative embodiments, the laptop 40 may be accessed by initially opening the housing 20 such that the top portion 22 remains in an upright position. Subsequently monitor 42 may be lifted open where the monitor 42 may be pushed flush against the top portion 22. In yet other embodiments, the top portion 22 may not be designed to remain vertical upon opening. In such other embodiments, the top portion 22 may fall away, such as towards the floor, where the opened laptop monitor 42 would not be framed by the top portion 22 during operation of the laptop.

The housing 20 may comprise any material or materials capable of providing a protective accommodation for foam and a laptop. Desirably, the housing is made up of a material that is lightweight and strong. In some embodiments, the housing 20 is comprised of materials that cause the housing 20 to maintain its shape, thus defining the shape of the case. For example, the housing may be comprised of a metal, hard polymer, or combinations thereof. Alternatively, the housing 20 may be comprised of a flexible polymer material that conforms to the contents of the housing 20.

Still referring to FIG. 1, flexible foam 30 may be fitted inside both the top portion 22 and bottom portion 23 of the housing 20. Further, the top portion 22, bottom portion 23, and fitted foam 30 may be dimensioned to frame a laptop 40 where the housing 20 frames the foam 30 and the foam 30 frames the laptop 40 such that the monitor 42 and base 44 of the laptop 40 are both fully framed by foam 30. Additionally, the foam may be fitted to the top portion 22 and bottom portion 23 such that the laptop 40 continues to remain fully framed and protected by the foam 30 when the monitor 42 is raised and the laptop 40 is in operation.

The flexible foam may comprise any conformable, polymeric material capable of providing padding for and conforming to a housing and laptop. The flexible foam may conform to accommodate various laptop sizes. In some embodiments, the foam in the top portion 22 and/or the bottom portion 23 comprises a hollow that snuggly accommodates a laptop 40. Such a hollow may be designed to accommodate various laptop sizes. Alternatively, different laptop sizes may require different, proportional hollow sizes. In some embodiments, the depth of the hollow (not shown) in the foam 30 in the bottom portion 23 of the housing 20 is such that the base 44 of the laptop 40 rests in the hollow at a depth that does not hinder air flow from the laptop 40 cooling fans (not shown). Thus, the depth of the hollow in the foam 30 is a fraction of the height of the base 44 suitable for allowing proper functioning of the laptop's cooling mechanism. Further, snug accommodation of the laptop base 44 further secures the laptop in the housing 20 and case 10 during transport and laptop operation.

The embodiments of FIG. 1 and FIG. 2 also illustrate legs 50. Relative to the housing 20 in FIG. 1, each leg comprises a proximal portion 56 (not visible in FIG. 1 or 2 for the third leg 50c), distal portion 57 that contacts the horizontal surface (not shown), and medial portion 58a, 58b. The medial portion of at least two of the legs extends through a plane (not shown) that bisects the housing 20 perpendicular to the front 25 and back 27 (FIG. 2). The legs 50 may be desirably positioned to render the case 10 self-bearing for operation of the laptop 40. In some embodiments where the case comprises three legs (not shown), the medial portion of each of the three legs extends through the plane that bisects the housing perpendicular to the front and back, the legs extending through the plane at substantially the same point.

In other embodiments where the case comprises four legs (FIGS. 1 and 2), the medial portion 58a of the first leg 50a and second leg 50b extend through the plane substantially at a first point 54a, and the medial portion 58b of the third leg 50c and fourth leg 50d extend through the plane substantially at a second point 54b different than the first point.

A user may situate the self-bearing case 10 and laptop 40 using the legs 50 such that the convenience of operating the laptop is equal to or greater than the convenience of resting the laptop-containing case 10 on any other surface. The crisscrossing points, such as the first point 54a and second point 54b of the legs 50 may be situated at a height such that a user does not have to sit with legs spread apart in order to work around wider-based stands or other frameworks. The crisscrossing design permits a user's knees to remain more comfortably close together, while also allowing for free movement of each leg away from the crisscrossing points. Further, a user does not have to provide support for the self-bearing case 10, thus promoting more freedom of movement, less heat transfer from the laptop to the user, and an overall greater degree of comfort during laptop operation.

In some embodiments, the legs 50 may be components of a detachable leg module 80 (FIGS. 1 and 2). Such a detachable leg module adds flexibility to the case 10 where carrying the case may warrant reducing the weight of the case.

Figure 3:
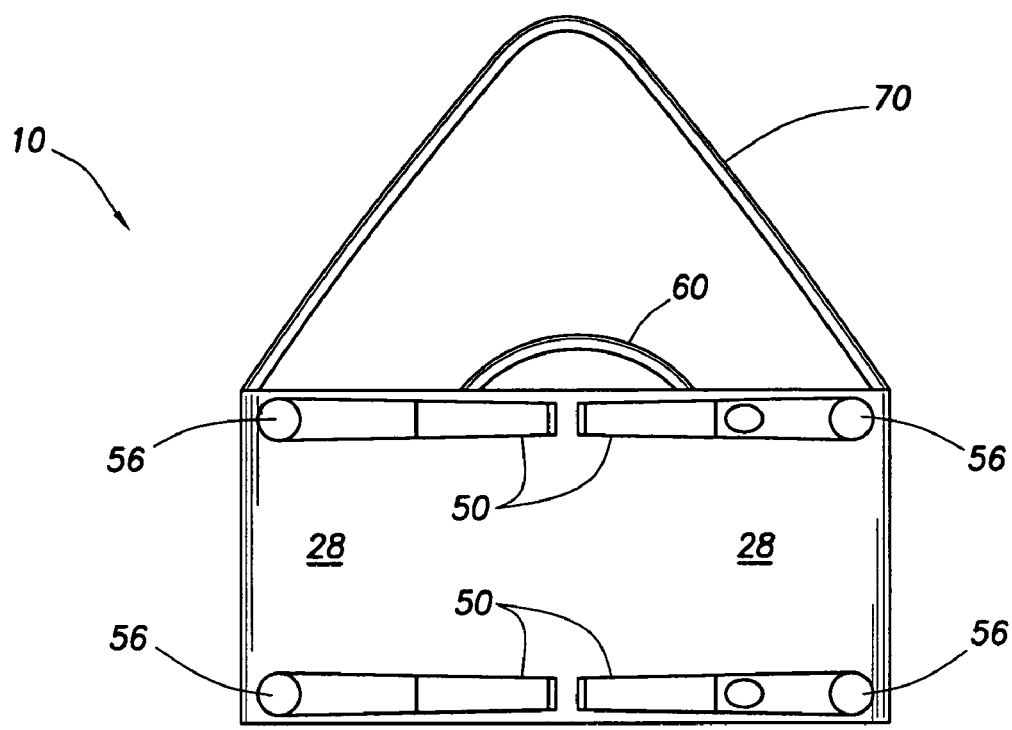
FIG. 3 illustrates an elevational view of the bottom of the case.

The embodiment of FIG. 3 illustrates an elevational view of the bottom 28 of the case 10 where the legs 50 are in a retracted position and are coupled to the bottom 28 of the case 10. Alternatively, the legs 50 may be coupled to a detachable leg module 80 (FIGS. 1 & 2) that is a removable part of the case 10.

The embodiment of FIG. 3 also illustrates the telescoping feature of the legs 50. The telescoping feature permits the legs 50 to be extended, as shown in FIGS. 1, 2, and 4, when the legs 50 will be used to support the case 10, and permits the legs 50 to be retracted, as shown in FIGS. 3 and 5, for storage and transport of the case 10.

Figure 5:
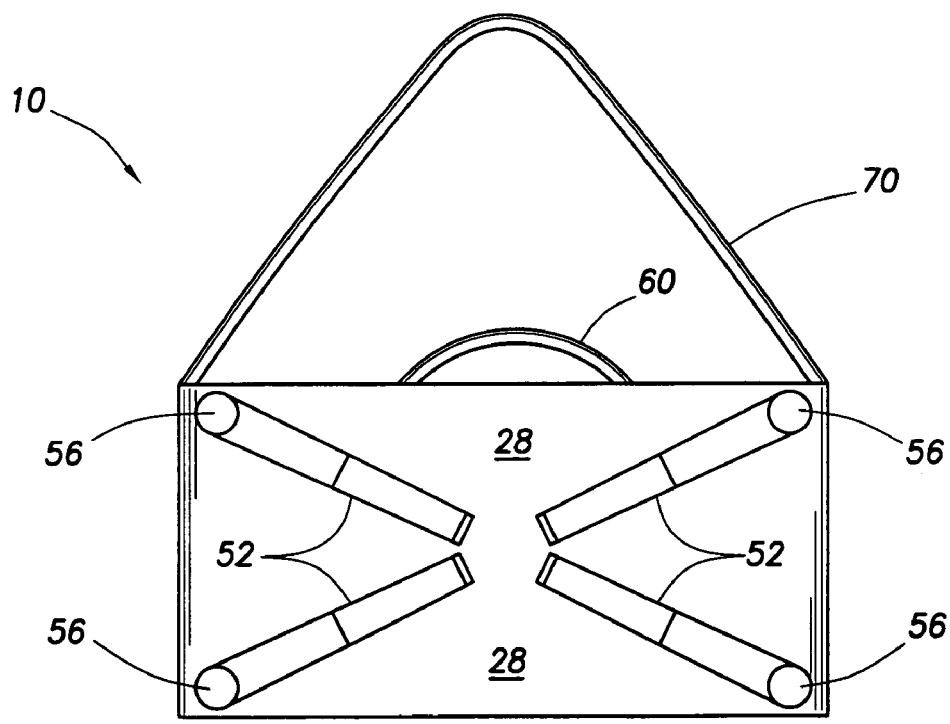
FIG. 5 illustrates alternative embodiments of the legs in a retracted position.
Figure 4:
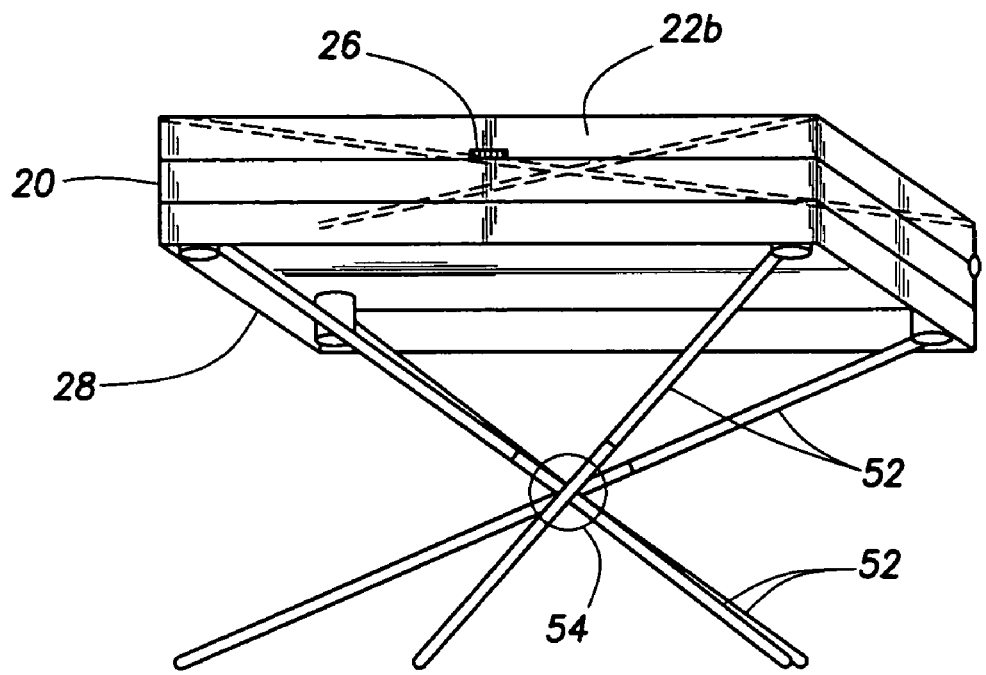
FIG. 4 illustrates alternative embodiments of the legs of the case in an extended orientation.

Turning now to FIGS. 4 and 5, these figures illustrate alternative embodiments for the legs. In particular, FIG. 4 illustrates legs 52 in an extended orientation. Unlike the legs 50 in FIGS. 1 through 3 that cross in pairs, in the embodiment of FIG. 4 the medial portion of each leg extends through a plane that bisects the housing perpendicular to the front and back at substantially the same point 54. Similarly, the embodiment of FIG. 5 shows the bottom 28 of the case 10 where the legs 50 are folded into the case 10 in a retracted position and where the legs 50 are configured to cross at the same point. In alternative embodiments, the legs 50 are designed such that the proximal end of each leg 56 (FIGS. 3 and 5) swivels either continuously or incrementally to various alternative positions. Such a swivel design at the proximal end 56 may permit the leg to swivel 360 degrees, or any fraction of 360 degrees, thus allowing a user (not shown) to configure the legs, either extended or retracted, in the way that maximizes utility in a particular situation.

Means of carrying the case are also advantageous. The embodiments of FIG. 3 and FIG. 5 illustrate the case 10 comprising a handle 60 and strap 70. Although the handle 60 and strap 70 shown are in specific locations, handles and straps may alternatively be positioned in other locations on the case 10. In addition, the materials and shapes of the handle and strap may be any suitable materials and shapes for manipulating/carrying the case. The case 10 may comprise multiple handles and straps to permit carrying the case in various positions. For example, two or more straps may facilitate the case being carried like a backpack. One or more wheels or rollers may be a further addition to the case where the wheels/rollers in combination with a suitable handle allow the case 10 to be rolled on the floor for transport, thus reducing the weight born by the carrier.

Figure 6:
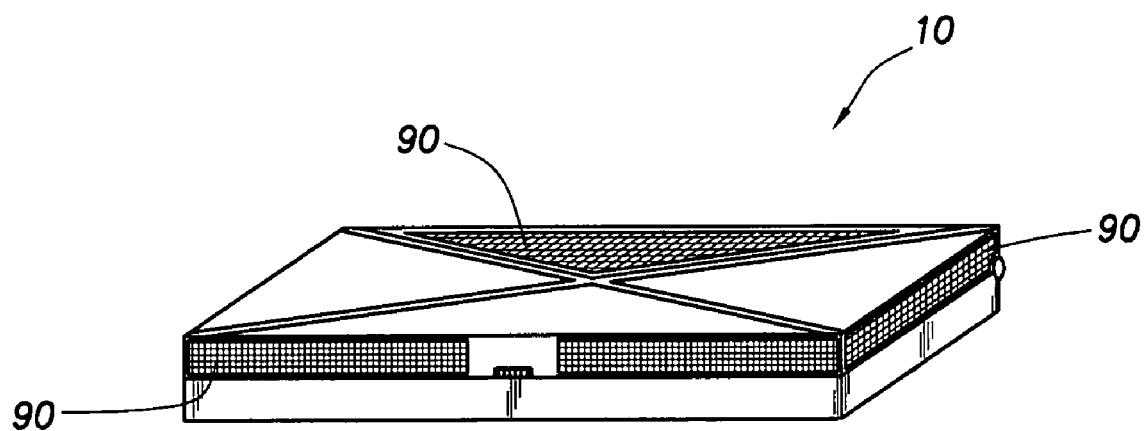
FIG. 6 illustrates an embodiment of the case including cooling panels.

The embodiment of FIG. 6 illustrates the incorporation of cooling panels 90 comprising a breathable material into the sides of the case. Such cooling panels 90 and breathable material facilitate cooling of the laptop when the case 10 is closed. Cooling fans in a laptop, for example, will be able to circulate air into and out of the case 10, even when the case is closed. Thus, after using a laptop a user will be able to close up the case 10 and transport the case/laptop while the breathable material of the cooling panels 90 permits the cooling mechanism of the laptop to perform its function. An example of a suitable breathable material is a net or mesh material that is breathable enough to facilitate cooling of a laptop in a closed case during and after use of the laptop. Depending on the type of cooling system employed in a laptop, cooling panels 90 may be used more or less generously and in different locations on the case 10.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. For example, four crisscrossing legs are employed in each of the configurations in FIGS. 1 through 5, but in alternative embodiments three crisscrossing legs may provide a tripod for supporting the case 10. Each and every claim is incorporated into the specification as an embodiment of the present invention.

What is claimed is:

1. A laptop computer case comprising:
   a housing that defines a top portion, bottom portion, front, back, left side, and right side;
   cooling panels that permit laptop fans to move air between the outside and inside of the case when the case is in a closed position; and
   legs coupled to the bottom portion of the housing, the legs extend from the housing to a substantially horizontal surface below the housing, wherein each leg has a proximal portion proximate to the housing, a distal portion that cotacts the horizontal surface, and a medial portion;
   wherein the medial portion of at least two of the legs extends through a plane that bisects the housing perpendicular to the front and back; and
   wherein the legs render the case self-bearing.

2. The laptop computer case of claim 1 further comprising three legs, and wherein the medial portion of each of the three legs extends through the plane that bisects the housing perpendicular to the front and back, the legs extending through the plane at substantially the same point.

3. The laptop computer case of claim 1 further comprising:
   a first, second, third and fourth legs;
   wherein the medial portion of the first and second legs extend through the plane substantially at a first point; and
   wherein the medial portion of the third and fourth legs extend through the plane substantially at a second point different than the first point.

4. The laptop computer case of claim 1 further comprising:
four legs;
wherein the medial portion of each leg extends through the plane at substantially the same point.

5. The laptop computer case of claim 1 further comprising a flexible foam within the housing that accommodates a laptop computer.

6. The laptop computer case of claim 1 wherein the legs are telescoping legs.

7. The laptop computer case of claim 6 wherein the telescoping legs fold into the case when retracted.

8. The laptop computer case of claim 1 further comprising:
a detachable module that selectively couples to the housing;
wherein the legs are coupled to the detachable module.

* * * * *